Figure 1:
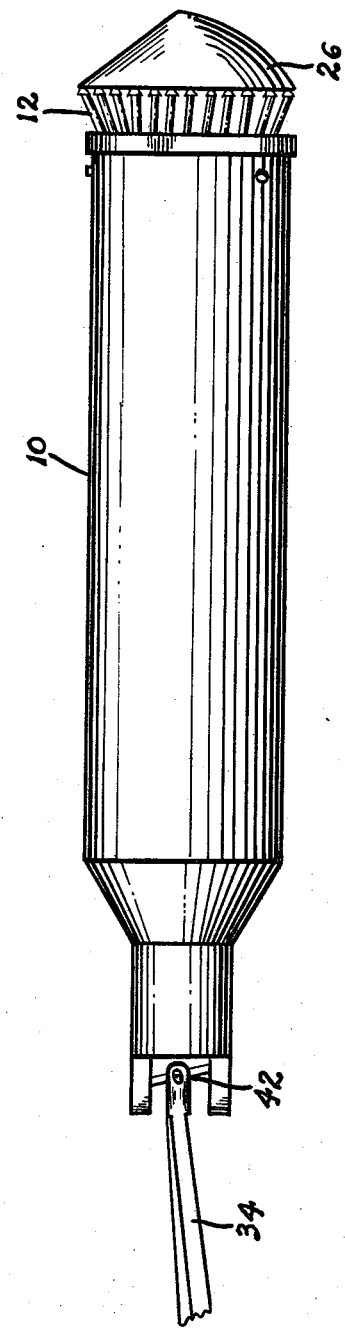

April 28, 1964

V. F. BOSWELL ETAL 3,131,391

SNORKEL SIMULATOR

Filed March 2, 1962

3 Sheets-Sheet 1

INVENTORS
VANCE F. BOSWELL
JAMES C. SHAW
BY

Lawrence S. Epstein
ATTORNEY

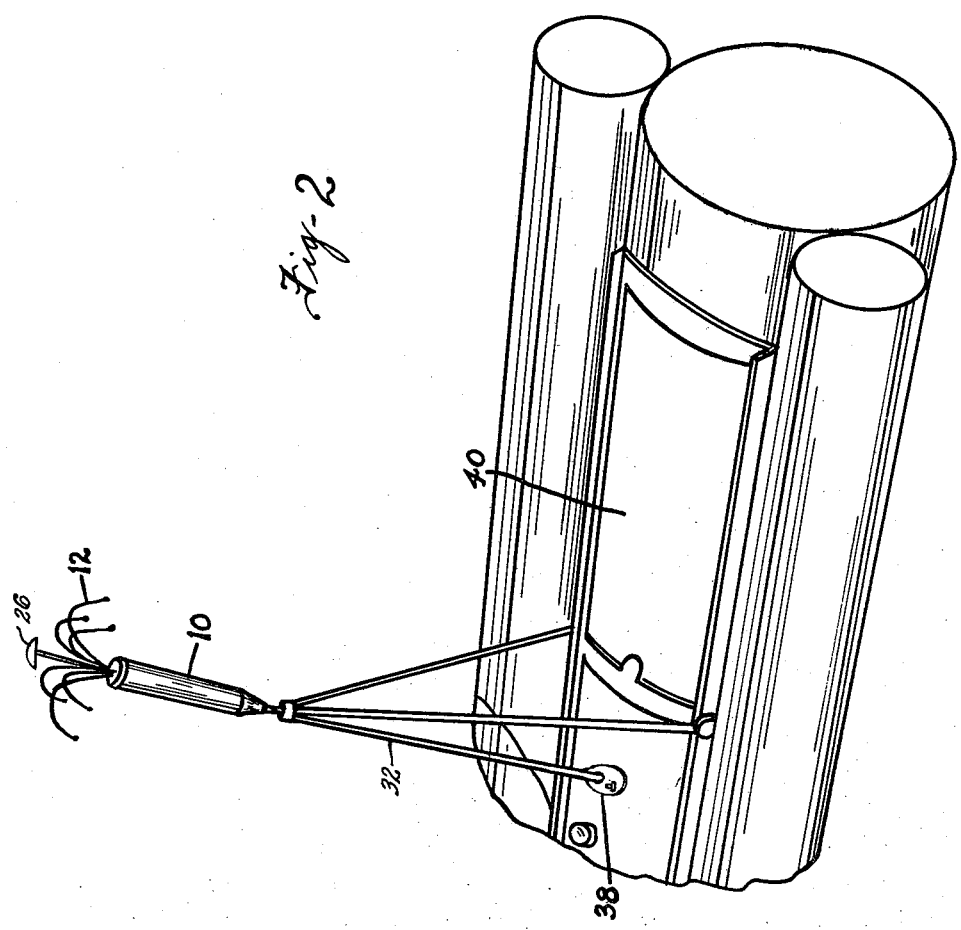

April 28, 1964
V. F. BOSWELL ETAL
3,131,391
SNORKEL SIMULATOR
Filed March 2, 1962
3 Sheets-Sheet 3
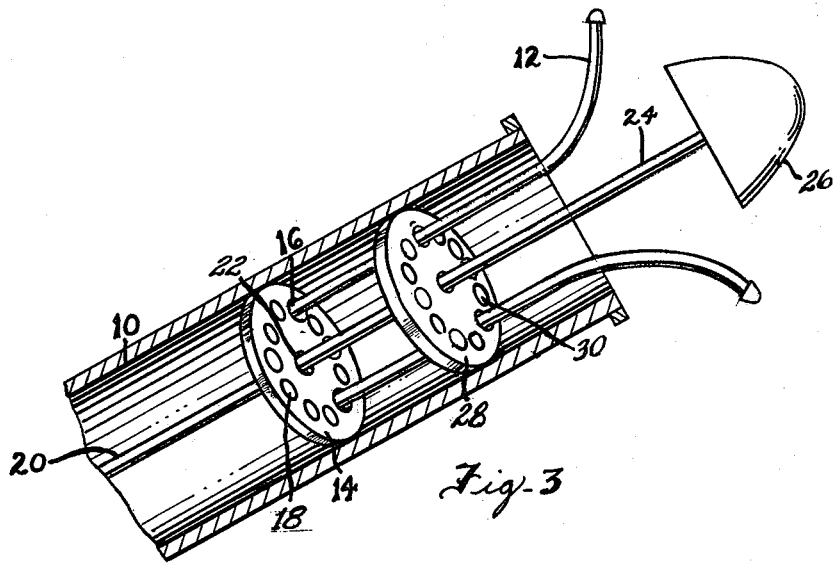
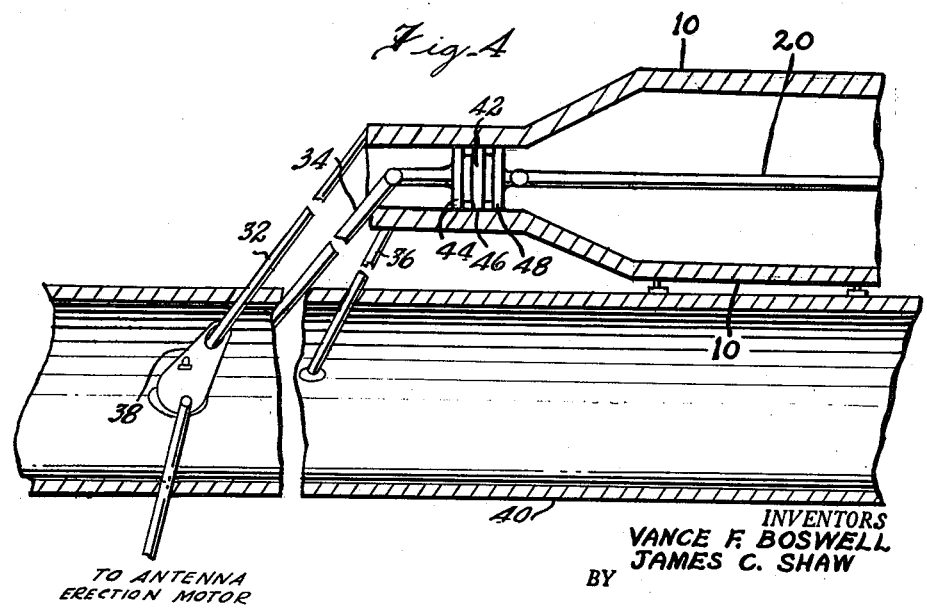
INVENTORS
VANCE F. BOSWELL
JAMES C. SHAW
BY
Lawrence S. Epstein
ATTORNEY

3,131,391
SNORKEL SIMULATOR
Vance F. Boswell, Rocky River, and James C. Shaw, Lorain, Ohio, assignors, by mesne assignments, to the United States of America as represented by the Secretary of the Navy
Filed Mar. 2, 1962, Ser. No. 177,141
4 Claims. (Cl. 343—18)

This invention relates to simulator devices and more particularly to a simulator device for simulating the appearance of a snorkel by the reflection of micro-wave radar energy from a collapsable reflector means.

The device comprises a retractable antenna having an umbrella rib structure. The ribs are retractable into an enclosure which is attached to a submarine simulator. The antenna acts as a radar reflector so as to simulate a snorkel and is adaptable to be used for radio transmission purposes. The size of the simulator device is relatively small compared to the size of an actual snorkel.

It is an object of the present invention to provide a novel reflector for radar micro-wave energy.

A further object of the instant invention is to provide a novel reflector for radar micro-wave energy which simulates a submarine snorkel.

Another object of the instant invention is to provide a novel submarine snorkel simulator which may be collapsed and folded into a small space.

Other objects and many of the attendant advantages of this invention will be readily appreciated as the same becomes better understood by reference to the following detailed description when considered in connection with the accompanying drawings wherein:

FIG. 1 is a view of the collapsed simulator structure;
FIG. 2 is a view of the submarine simulator with the snorkel simulator erected;
FIG. 3 is a perspective cutaway view of the submarine simulator; and
FIG. 4 is a prespective cutaway view of the mounting for the antenna simulator.

Referring to FIG. 1, the snorkel simulator comprises a capsule 10 which houses the elements 12 of the antenna assembly. There are twelve of these elements 12. Each of these elements is a section of No. 14 diameter Phosphor bronze, spring-tempered wire, fourteen inches long with a curvature which is equivalent to an arc of a circle having an eight-inch radius and mounted so as to reflect outward from the center of the mounting 14. Each of these wires is mounted around the circumference of insulated mounting section 14 and secured at point 16. Mounting plate 14 has twelve holes 18 drilled around its circumference. Each of these holes holds an element 12 of the antenna simulator. A hole in the center of mounting plate 20 contains the erecting and retracting arm 20 which is secured at point 22. The erecting and retracting arm 20 has an extension 24 on the end of which is mounted a depresser 26. This depressor is utilized to depress the antenna elements 12 when the antenna is retracted. Each of the elements 12 passes through a hole 30 drilled in guide plate 28 which maintains the relationship of the wire elements. This guide plate 28 is of an insulating material. The capsule 10 is mounted by means of mounting rods 32, 34 and 36 which are attached to the surface of the submarine 40. The capsule is erected by means of antenna erection mechanism 38.

Upon the operation of the antenna erection mechanism to erect the antenna, the capsule is rotated to a position 90 degrees with respect to its horizontal retracted position on the upper surface of the submarine simulator 40. In moving the capsule to this 90 degree erect position, the antenna erection arm 20 is moved up through the capsule pushing the guide plate 14 and elements 12 up and out of the capsule. At termination of the motion of the antenna, it is held by guide plate 28. Piston 42 which contains O rings 44, 46 and 48 moves within the end section of the capsule 10 and maintains a water-tight seal while the antenna is being erected or retracted or while antenna is under water.

The antenna capsule is approximately twenty-four inches end-to-end with each of the elements 12 comprised of No. 14 (.0641 inch thick Phosphor bronze, spring-tempered steel, fourteen inches long with a curvature which is equivalent to an arc of a circle having an eight-inch radius). The antenna capsule 10 is made of a plastic material and is so designed that when the erection mechanism raises the antenna capsule from its normal position against the hull of the mobile body 42 to a position 90 degrees from the hull, the antenna elements are automatically pushed out through the perforated guide 28 to resemble an umbrella-like framework.

Under test, the snorkel simulator was detected by an airborne S-band radar at thirty miles at an altitude of 30,000 feet. The snorkel simulator was held continuously with the S-band radar to a range five miles at an altitude of 3,000 feet where it was picked up on an X-band radar. The snorkel simulator was successfully detected by a shipborne S-band radar at a range of 1,150 yards.

Obviously many modifications and variations of the present invention are possible in the light of the above teachings. It is therefore to be understood that within the scope of the appended claims the invention may be practiced otherwise than as specifically described.

What is claimed is:
1. A reflector for reflecting electro-magnetic radiation comprising a mast section, a plurality of electro-magnetic radiating arms fixedly mounted on said mast, said arms presenting a multiplicity of outwardly projecting apices equidistant from a common center whereby said electro-magnetically radiating arms simulate the snorkel of a submarine to a transmitted radar signal, said electro-magnetically radiating arms being flexible and said structure having a mounting plate member upon which said radiating arms are mounted, said mounting plate member being mounted on said mast section and being movable, a tube member mounted over said mast section, said mounting plate member being movable within said tube member whereby said plurality of flexible radiating arms are able to be erected or retracted in and out of said tube member, a guide plate member mounted with said tube member for maintaining said plurality of radiating arms equally aligned with each other, a depresser member, said depresser member being mounted on said mast section member whereby said plural radiating arm members are depressed and maintained rigid in their at rest, retracted position within said tube member, and a piston sealing member movably mounted within said tube member for sealing said tube member from the entrance of water.

2. The combination of claim 1 and erecting and retracting means operatively connected to said tube member and to said mast and piston member whereby operation of said erection means causes said tube member to erect at an angle of 90 degrees to its at rest retracted position and said radiating arm members to be projected outward from said tube member.

3. The combination of claim 2 wherein said plural support arm members comprises twelve individual elements, each of said elements being of a size to radiate and provide a snorkel simulation return echo to both S and X-band radars.

4. The combination of claim 3 wherein said plural support arm members are each comprised of twelve separate elements, each of which is fourteen inches long and each of which forms an arc of a circle having an eight-inch radius.

References Cited in the file of this patent

UNITED STATES PATENTS

| | | |
|---|---|---|
| 1,748,874 | Fentress | Feb. 25, 1930 |
| 2,051,737 | Okamoto et al. | Aug. 18, 1936 |
| 2,358,079 | Kridler | Sept. 12, 1944 |

FOREIGN PATENTS

| | | |
|---|---|---|
| 1,127,480 | France | Aug. 13, 1956 |